United States Patent
Khawand et al.

(10) Patent No.: US 10,455,536 B1
(45) Date of Patent: Oct. 22, 2019

(54) PROVISIONAL DEVICE REGISTRATION

(71) Applicant: Microsoft Technology Licensing, LLC, Redmond, WA (US)

(72) Inventors: Jean Khawand, Redmond, WA (US); Anand Muthurajan, Redmond, WA (US); John D. Bruner, Bellevue, WA (US); Sohail Hirani, Redmond, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 0 days.

(21) Appl. No.: 16/186,375

(22) Filed: Nov. 9, 2018

(51) Int. Cl.
*H04W 60/00* (2009.01)
*H04W 48/02* (2009.01)
*H04W 8/18* (2009.01)
*H04W 4/90* (2018.01)
*H04B 1/3816* (2015.01)

(52) U.S. Cl.
CPC ......... *H04W 60/00* (2013.01); *H04B 1/3816* (2013.01); *H04W 4/90* (2018.02); *H04W 8/183* (2013.01); *H04W 48/02* (2013.01)

(58) Field of Classification Search
CPC ....... H04W 60/00; H04W 4/90; H04W 8/183; H04W 48/02; H04W 8/265; H04B 1/3816
See application file for complete search history.

(56) References Cited

U.S. PATENT DOCUMENTS

| | | | |
|---|---|---|---|
| 8,620,315 B1 * | 12/2013 | Merritt | G06F 21/35 380/247 |
| 2014/0045460 A1 * | 2/2014 | Park | H04W 8/205 455/411 |
| 2016/0344872 A1 * | 11/2016 | Mathison | H04M 15/715 |
| 2017/0180349 A1 * | 6/2017 | Park | H04W 12/06 |
| 2018/0176768 A1 * | 6/2018 | Baek | H04W 8/205 |
| 2019/0037335 A1 * | 1/2019 | Steck | H04W 8/245 |

* cited by examiner

*Primary Examiner* — Marisol Figueroa
(74) *Attorney, Agent, or Firm* — Newport IP, LLC; Han Gim

(57) ABSTRACT

Mobile devices are provisionally registered when the mobile device does not have an active subscription profile. A communications session is established with an access network of a mobile communications network. Identification data for the computing device is sent to the access network. A connectivity configuration is used to allow the computing device to establish a limited connection on the mobile communications network. Using the limited connection, an eSIM profile is received. The eSIM profile is activated and the device is connected to an associated mobile network.

19 Claims, 7 Drawing Sheets

PROVISIONAL DEVICE REGISTRATION

BACKGROUND

Service providers for communications devices generally require that the communications device have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or Internet data service.

The credentials may reside in a secure container called a Universal Integrated Circuit Card (UICC) or "SIM card." The UICC may be embedded in the communications device, in which case it may be called an embedded UICC (eUICC) or an eSIM. The credentials may be provisioned to the UICC or eUICC/eSIM when manufactured or may be provisioned to the UICC or eUICC/eSIM remotely while the UICC or eUICC/eSIM resides in the communications device.

An eSIM-capable device (e.g., an Always Connected PC) typically ships with an empty eSIM. In order to use cellular connectivity, the device must connect to a specific remote server (SM-DP+) to download an eSIM profile (i.e., the mobile operator credentials needed to use the cellular modem).

If the device has some form of local Internet connectivity (such as WiFi), then as per the industry-accepted GSMA specification it can interrogate a global discovery server (SM-DS) to obtain the necessary contact information for the download server. However, in some cases, the device may not be able to connect directly to the Internet. The inability to provide the initial eSIM profile to devices causes delays in allowing users and enterprises to utilize new devices or in any situation where devices don't have provisioning profiles or operational profiles. Furthermore, the use of provisioning profiles on a device must be paid by the OEMs which adds to the BOM costs for the device.

It is with respect to these considerations and others that the disclosure made herein is presented.

SUMMARY

The disclosed embodiments describe technologies for allowing an unprovisioned eSIM-capable device to provisionally access a local mobile network and communicate with one or more mobile network operators in order to provision its eSIM, even when the device has no other direct means of accessing the Internet such as Wifi. In some embodiments, this may entail being able to contact the eSIM download server (e.g., the SM-DP+) to subscribe or otherwise obtain subscription credentials. In various embodiments, methods and systems are described for implementing an infrastructure for the purpose of subscribing to and/or downloading eSIM profiles without a SIM or active profile on a device.

In one example scenario, it is desirable for enterprises to configure their mobile devices to be automatically connected and configured per enterprise specifications when the devices are turned on. If connectivity is available, then the device may be enrolled via enterprise processes and enterprise images may be downloaded in accordance with enterprise policies and specifications. However, if the device is turned on in an area where there is no Wifi, the device may not be able to use over-the-air connectivity via a mobile carrier because the device has not yet been provisioned for such services.

In another scenario, a user may obtain an unregistered device that is eSIM-capable but has not yet been provisioned to be serviced by a mobile network operator. Without another means to connect (e.g., via Wifi), then the device will not be provisioned until the device can be moved to another location that has Wifi or other connectivity means, such as to a Wifi hotspot. The described embodiments describe techniques for enabling the provisioning of a device under such circumstances, where there is no other connectivity for a device that is eSIM-capable but has not yet been provisioned. While provisioning profiles can be used, the profile needs to be present on the device which increases costs for the OEM to add the profile to the device and maintain an active status.

In cellular networks, a mobile phone/device can connect to a cellular network to access emergency services even when there is no SIM inserted in the device by using the device identity. The present disclosure provides a way for a device to subscribe and obtain credentials it needs to access a mobile network, using the infrastructure for providing the emergency services. Alternatively, existing mobile network infrastructure may be modified to allow for devices to provisionally connect to a limited set of services in order to subscribe to mobile network services.

In the case of eSIMs, the card has a unique eSIM identifier (EID) as well as certificates that uniquely identify the eSIM. In an embodiment, during the initial bootstrap when the device does not have any active eSIM profile, a bootstrap registration procedure can be performed. In an embodiment, the mobile network may be configured to allow the device to connect to the mobile network with limited connectivity. The device may further be allowed to receive and browse plans available to the device. The device may be able to select a plan to subscribe to and download the selected eSIM profile. Additionally, the device may activate or switch to the downloaded profile and register on the network, allowing the device to use the network as a regular subscriber (i.e., the device will no longer be a provisionally registered device).

In some embodiments, when the device is an enterprise device, when the EID/device identity is matched with an enterprise device preconfigured in the network, the SM-DS query may automatically result in the availability of a profile for the device that can be downloaded without the need for the device to browse and select plans.

In an embodiment, the provisional registration process can include biometric identification to authenticate the user in addition to other authentication methods such as enterprise login credential/open id credentials. The provisional registration process can further include safeguards to prevent misuse of the provisional registration process. For example, the provisional registration process may limit the number of times a particular device and EID is allowed to attempt the provisional registration.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION OF ILLUSTRATIVE EMBODIMENTS

Figure 1:
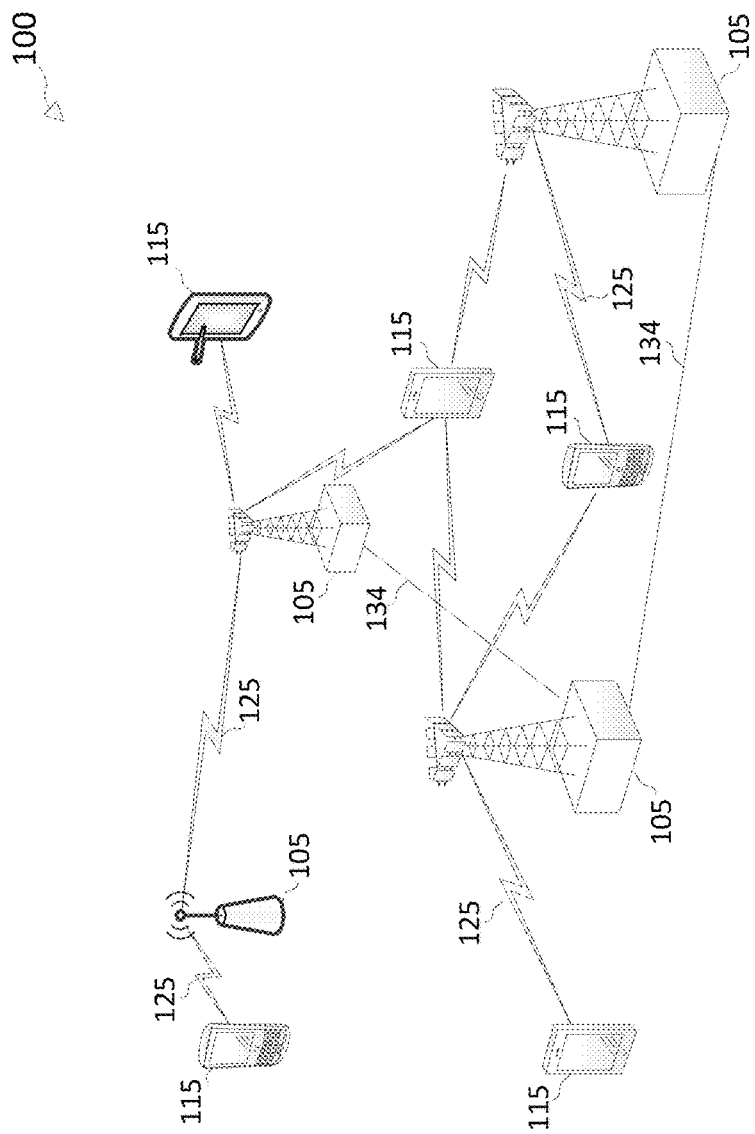
FIG. 1 depicts an example of a networked environment where aspects of the disclosure may be implemented.

A device that is capable of communicating on a mobile network but is not yet provisioned to do so typically obtain its provisioning information by accessing the Internet via means other than the mobile network, such as a Wifi Internet connection. However, when alternate means to access the Internet are not available, the device will not be able to obtain its credentials until the device is able to access the Internet. The GSMA eSIM specification defines a way for a device to discover provisioning information using a global discovery server (e.g., the SM-DS). However, many mobile operators do not use the SM-DS. Additionally, the device may not have access to the Internet or other means to access the SM-DS aside from using the mobile network, which it cannot do because it is not yet provisioned. The present disclosure describes systems and methods for allowing a device to use a mobile network to establish a first connection on a network through which the eSIM can be provisioned. In this way, a device that is not yet provisioned may establish a provisional connection to the mobile network in order to provision its eSIM, even when the device has no other direct means of accessing the Internet.

While the present disclosure describes embodiments in the context of a mobile device such as a smartphone managed by an enterprise, the described techniques may be implemented in various settings where a device that is eSIM-capable is unable to be activated on a mobile network because it does not have its own direct means of accessing the Internet in order to obtain its mobile operator subscription information.

While the GSMA allows for a process to use a special SIM profile, called a "provisioning profile". to obtain an initial connection, the GSMA process only allows that profile to be used for connections to servers to download full-capability eSIM profiles, called "operational profiles". The device still needs an eSIM card, must provide its EID, and still needs an operational profile in advance that is provided by some MNO for that EID. The OEM must provision the provisioning profile at the time of device manufacture, the cost of which must be provided by the OEM or another entity. These requirements may limit the implementation of this process.

In some embodiments, a modified emergency services registration may be implemented to provide an initial connection to an unregistered device and allow use of the radio infrastructure of the attached network to download a profile. The initial connection may be sufficient to allow the device to subscribe to and obtain a profile from a mobile network operator. Given the widespread availability of emergency services frameworks that allow any device to connect to and access emergency services (e.g., 911 services), such an infrastructure may provide a widely available infrastructure to provide provisional registration services for unregistered devices.

In such a scenario, the ID of the device rather than a subscription may be used to obtain limited access to a mobile network for a limited purpose. Currently there are two types of device registration. One is a standard device registration where the device may be allowed to make calls and use data services. The other type of registration is emergency registration, where the device's IMEI is used for limited registration and the device may be used for emergency purposes. In a typical emergency services network, an unregistered device may establish a connection to the emergency services network which may set up a data connection on top of the emergency registration. Since a data service to a server must be established to handle control for the emergency call and the media for the emergency call, a framework is in place to provide a similar limited registration for a non-emergency registration service such as the provisional registration service as described herein. The provisional registration may include an authentication for special-purpose limited connectivity for the provisional registration process.

In one embodiment, an additional registration process may be added to the emergency registration process. In an embodiment, the eSIM certificate for the device may be used to provide additional authentication for the device and implement a provisional, non-emergency registration. Since the eSIM has an EID, the network may verify that the device is a unique device and allow for provisional registration.

In some embodiments, additional functionality may be provided in the mobile network infrastructure to allow for provisional device registration. Mobile networks include access networks that includes cell towers and cell radios which provide the local over-the-air connection to mobile devices. Mobile networks typically have a core network that is configured to provide administration and identification of subscribers. In some scenarios, for example in 5G networks, multiple core networks may be served by the same access network. Thus the access network may be configured to implement a provisional registration process and allow a device to access and select multiple mobile network operators through the multiple core networks.

In one embodiment, a separate core network may be implemented that may be configured to provide provisional connectivity for unregistered devices. The separate core network may be provided by the same network operator as the core network, another network operator, or may not be tied to a single network operator.

In some of the various described embodiments, the ID of the device's UICC card may be used to provide access to a backend service for provisional registration.

In some embodiments, a mobile network operator may provide the additional access services so that devices can subscribe to and reach the network operator's subscription and download server. Such a server may be configured to provide information for mobile plans and provide profile downloads. In some embodiments, the mobile network operator may provide for automatic provisioning once a plan is selected. During the provisional registration process and until the device subscribes to a plan, the device may only be allowed to access basic subscription information and not allowed to generally access the Internet.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

FIG. 1 is a block diagram conceptually illustrating an example of a wireless communications system 100, in accordance with an aspect of the present disclosure. The wireless communications system 100 includes base stations (or cells) 105 and mobile devices 115. The base stations 105 may communicate with the mobile devices 115 under the control of a base station controller (not shown), which may be part of a core network or the base stations 105. The wireless communications system 100 may support operation on multiple carriers. Multi-carrier transmitters can transmit modulated signals simultaneously on the multiple carriers. For example, each communication link 125 may be a multi-carrier signal modulated according to the various radio technologies described above.

The base stations 105 may wirelessly communicate with the mobile devices 115 via one or more base station antennas. The base stations 105 sites may provide communication coverage for respective coverage areas. The mobile devices 115 may be located throughout the wireless communications system 100 and may be stationary or mobile. A mobile device 115 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 115 may be a cellular phone, a wireless modem, a wireless communication device, a handheld device, a tablet computer, a laptop computer, or the like. The communication links 125 shown in the wireless communications system 100 may include uplink (UL) transmissions from a mobile device 115 to a base station 105, and/or downlink (DL) transmissions, from a base station 105 to a mobile device 115.

Figure 2:
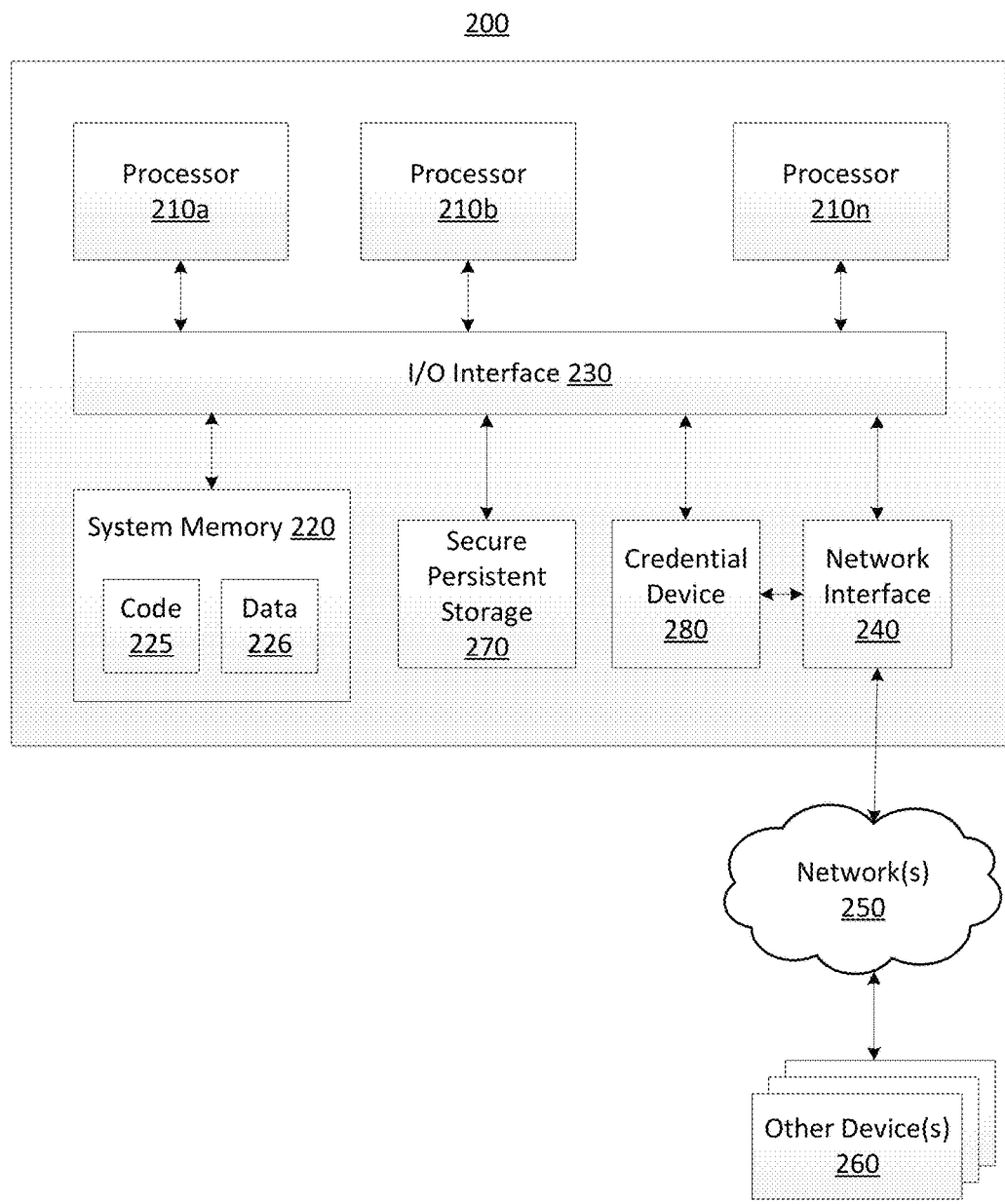
FIG. 2 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 2 illustrates such a general-purpose computing device 200. In the illustrated embodiment, computing device 200 includes one or more processors 210a, 210b, and/or 210n (which may be referred herein singularly as "a processor 210" or in the plural as "the processors 210") coupled to a system memory 220 via an input/output (I/O) interface 230. Computing device 200 further includes a network interface 240 coupled to I/O interface 230.

In various embodiments, computing device 200 may be a uniprocessor system including one processor 210 or a multiprocessor system including several processors 210 (e.g., two, four, eight, or another suitable number). Processors 210 may be any suitable processors capable of executing instructions. For example, in various embodiments, processors 210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 210 may commonly, but not necessarily, implement the same ISA.

System memory 220 may be configured to store instructions and data accessible by processor(s) 210. In various embodiments, system memory 220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 220 as code 225 and data 226. In various embodiments, secure persistent storage 270 may be present, either within System Memory 220 or separate from it, to hold non-volatile privacy-sensitive information.

In one embodiment, I/O interface 230 may be configured to coordinate I/O traffic between processor 210, system memory 220, and any peripheral devices in the device, including network interface 240 or other peripheral interfaces. In some embodiments, I/O interface 230 may perform any necessary protocol, timing, or other data transformations to convert data signals from one component (e.g., system memory 220) into a format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. Also, in some embodiments some or all of the functionality of I/O interface 230, such as an interface to system memory 220, may be incorporated directly into processor 210.

Network interface 240 may be configured to allow data to be exchanged between computing device 200 and other device or devices 260 attached to a network or network(s) 250, such as other computer systems or devices as illustrated in FIGS. 1 through 7, for example. In various embodiments, network interface 240 may support communication via any suitable wired or wireless general data networks, such as types of Ethernet networks, for example. Additionally, network interface 240 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 240 provides cellular communication its operation may be supported by a credential device 280 that may provide authentication, authorization, and other related information and services.

In some embodiments, system memory 220 may be one embodiment of a computer-accessible medium configured to store program instructions and data as described herein for FIGS. 1-7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 200 via I/O interface 230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 200 as system memory 220 or another type of memory. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

Figure 3:
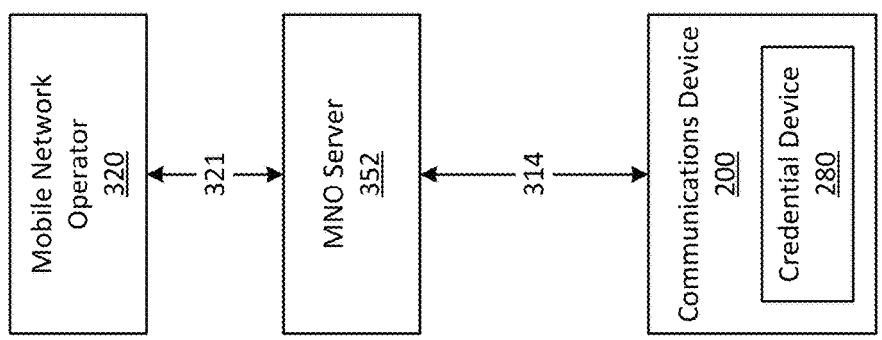
FIG. 3 depicts an example environment for provisional registration of mobile devices.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 280), and the like. With reference to FIG. 3, credential device 280 such as a UICC or eUICC may be included in the communications device 200 to ensure the integrity and security of personal data and enables communications with mobile communications providers. Such a communications device 200 may embody aspects of the computing device depicted in FIG. 2, and in some embodiments may incorporate one or more network interfaces 240 that communicates over a cellular network.

The 3rd Generation Partnership Project (3GPP) has defined specifications for communications devices covering technologies such as Global System for Mobile Communications (GSM), Universal Mobile Telecommunications System (UMTS), and Long-Term Evolution (LTE). The 3rd Generation Partnership Project 2 (3GPP2) has defined other specifications including Code Division Multiple Access (CDMA). For communications devices complying with these 3GPP or 3GPP2 specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 320 may include both data and instructions. When the instructions are executed on a processor, such as the processor of credential device 280 within a mobile communications device 200, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

A eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. A eUICC profile, may include a combination of file structure, data, and applications associated with the service credentials provisioned onto a credential device and which enable the communications device to use the subscription services associated with that profile.

For example, the GSM Alliance (GSMA) has defined an architecture for remote provisioning of a communications device for subscription services without physically swapping SIM cards for machine-to-machine scenarios by using a eUICC. Some automobile telematics systems are examples of systems that use eUICC devices. While the use of a eUICC may enable limited subscription credential management without having to manage physical smart cards, the GSMA architecture does not enable third parties, such as an MNO's enterprise customers, to manage subscription credentials.

FIG. 3 depicts one example environment for provisioning of profiles. A MNO 320 may own or otherwise control one or more MNO servers 352 through an interface 321. A communications device, also known as User Equipment (UE) 200 may, for example, be a mobile communications device containing a credential device 280. The credential device 280 may refer to a physically removable device containing electronic credentials, such as a SIM card or removable eUICC, a non-removable device that can be electronically provisioned with subscription credentials, such as a soldered eUICC, or the like. The credential device 280 may also refer to a software container that can contain one or more e-profiles and that can be electronically provisioned with subscription credentials in accordance with some embodiments.

Once provisioned with credentials on a credential device 280, UE 200 may be configured to use the provisioned credentials to access MNO subscription services via network connection 314. Network connection 314 may also enable UE 200 to access enterprise services or resources. Network connection 314 may be any type of computer network connection, including wired, WiFi, a cellular data connection, and the like.

In some embodiments, the credential device 280 may be a SIM card or removable eUICC which may be provided by MNO 320 or other manufacturer.

Figure 4:
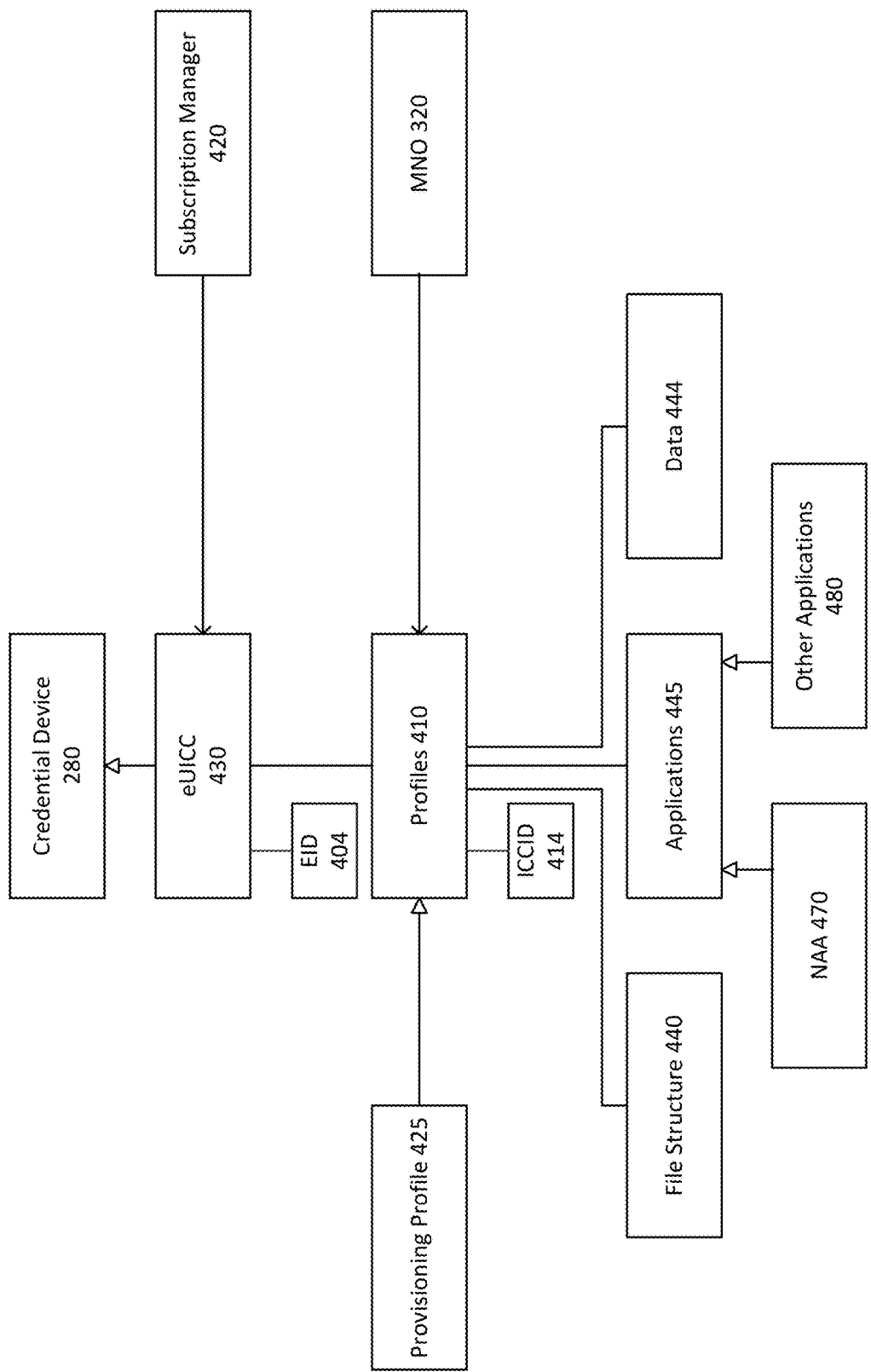
FIG. 4 depicts an example system for provisional registration of mobile devices.

FIG. 4 depicts an example logical structure for a credential device 280 that may include a eUICC 430 containing profiles 410. Each profile may have a globally unique identifier referred to as ICCID 414. In some embodiments, eUICC 430 may be identified by a globally unique value referred to as the eUICC-ID or EID 404.

A credential device 280 may be implemented by an eUICC 430, which may be one embodiment of the credential device 280 of FIG. 3. A physical UICC may be another embodiment. As depicted in FIG. 4, the subscription manager 420 may communicate with the credential device 280 (such as eUICC 430).

At least one of the profiles 410 contained in the eUICC 430 may be used to provide connectivity to the subscription manager 420 for profile management. This profile may be designated as a provisioning profile 425.

Figure 5:
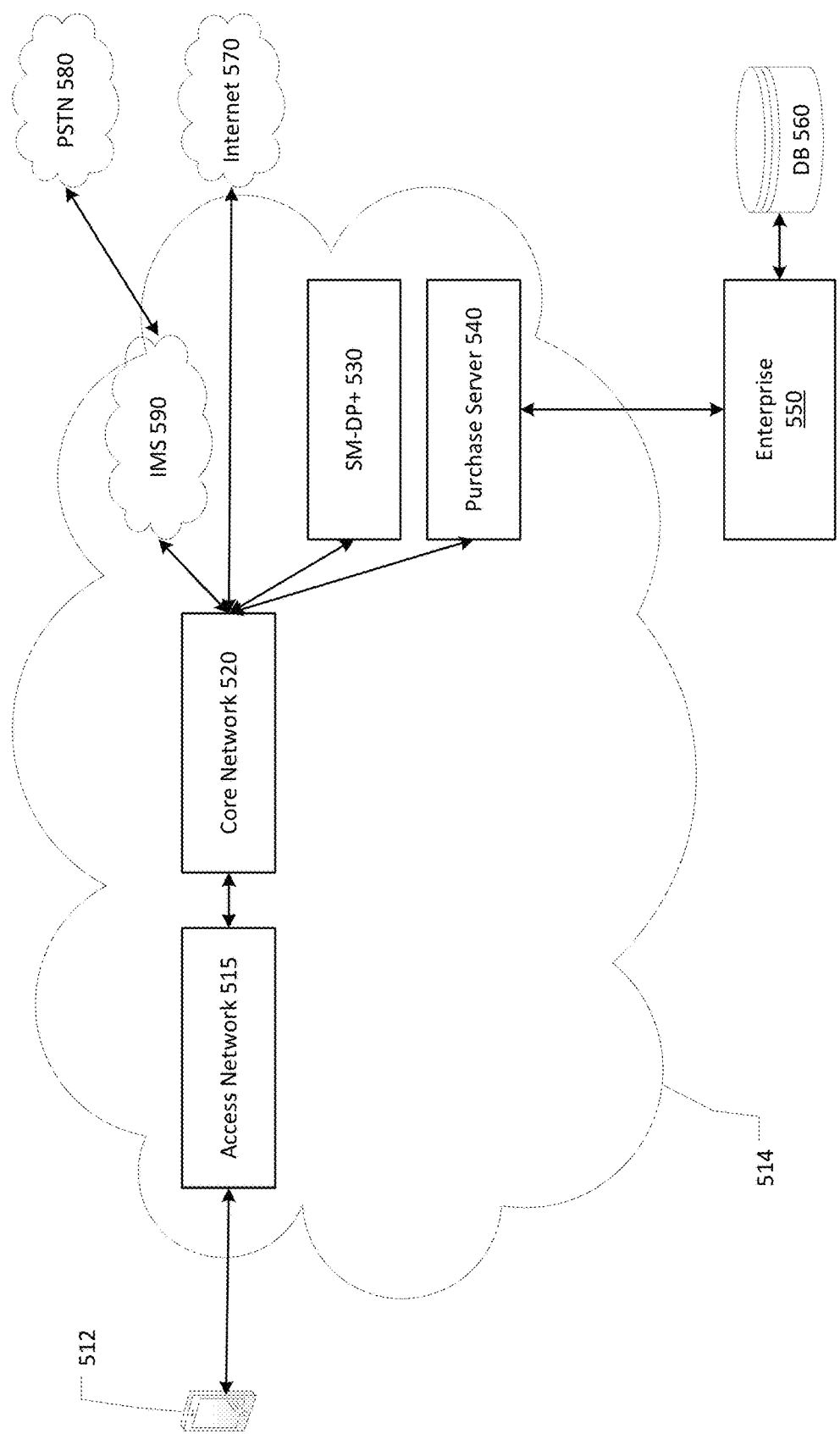
FIG. 5 depicts an example system for provisional registration of mobile devices.

Referring to FIG. 5, illustrated is an example system for provisionally registering devices, where a device 512 connects through an access network 515 to a core network 520 that is configured to provide connectivity and provide access to purchase servers that allow a device to subscribe to a subscription profile. In some embodiments, an activation code may be provided to the device, which may be used to download a profile. In one embodiment, core network 520 is configured to provide connectivity which allows for access to purchase server 540 and SM-DP+ 530 where the profile may be obtained. The connectivity may be used to obtain the eSIM profile. Once the activation code is obtained, the activation code may be used to obtain a profile from the SM-DP+ 530. Once downloaded, the device can be activated and used as a registered SIM to connect to the network. General access to the Internet may be restricted and access to purchase and download servers may be enabled. Initial attachment to the access network may be established per industry standards.

In some implementations, a firewall may be established to restrict access to the Internet by provisionally registered devices. Optionally, access speeds can be throttled for provisionally registered devices, since profiles are typically small files and do not require substantial bandwidth, thus discouraging use of the provisional registration for other purposes. In some embodiments, a specific EID/device may only be allowed to access the network for provisioning purposes N times a day, with no restrictions on the first M times and imposed delays on the next N-M times. In some scenarios, roaming agreements may be established between mobile network operators in the context of provisional registrations.

In some embodiments, when the unregistered device is an enterprise device, the device may have one of a number of pre-assigned profiles for the enterprise. The provisional registration may allow for discovery of the device, and based on the device's EID, the device may be allowed to access the SM-DS and obtain an associated pre-assigned profile.

In other embodiments, in an Internet of Things (IoT) network, the described techniques may be used to allow IoT devices to be provisioned. For example, it would be advantageous to be able to ship IoT devices that are capable of communicating on a mobile network, turn them on in the field, and be able to provision the IoT device without having been pre-provisioned.

The disclosed techniques thus allow a device to access limited connectivity for purpose of obtaining a profile for subscribing to mobile network services. Referring to FIG. 5, according to an embodiment of the present disclosure for provisional registering on a cellular network 514, a device 512 may attach to core network 520 by providing its IMEI and/or EID for authentication. A connectivity configuration may be provided by the core network to enable access to purchase server (SM-DS) 540. The device may send a purchase request to the purchase server (SM-DS) 540. An activation code may be provided by the purchase server (SM-DS) 540, which may be used to access the SM-DP+ 530. The SM-DP+ 530 may provide an eSIM profile for download to the device 512. The device 512 may activate the downloaded eSIM profile and connect to the associated mobile network, after which the device may access the PSTN 580, Internet 570, and other services provided by the mobile network operator.

The device 512 may be identified by unique information such as the IMEI or serial number. In one embodiment, if the device 512 is an enterprise device, then an enterprise server 550 may be queried to map the device unique information, verify that the device unique information is associated with an enterprise device, and obtain the subscription information for the device 512. Enterprise server 550 may send this information to the device 512. Device 512 may then communicate to the SM-DP+ 530 to obtain its subscription credentials.

Figure 6:
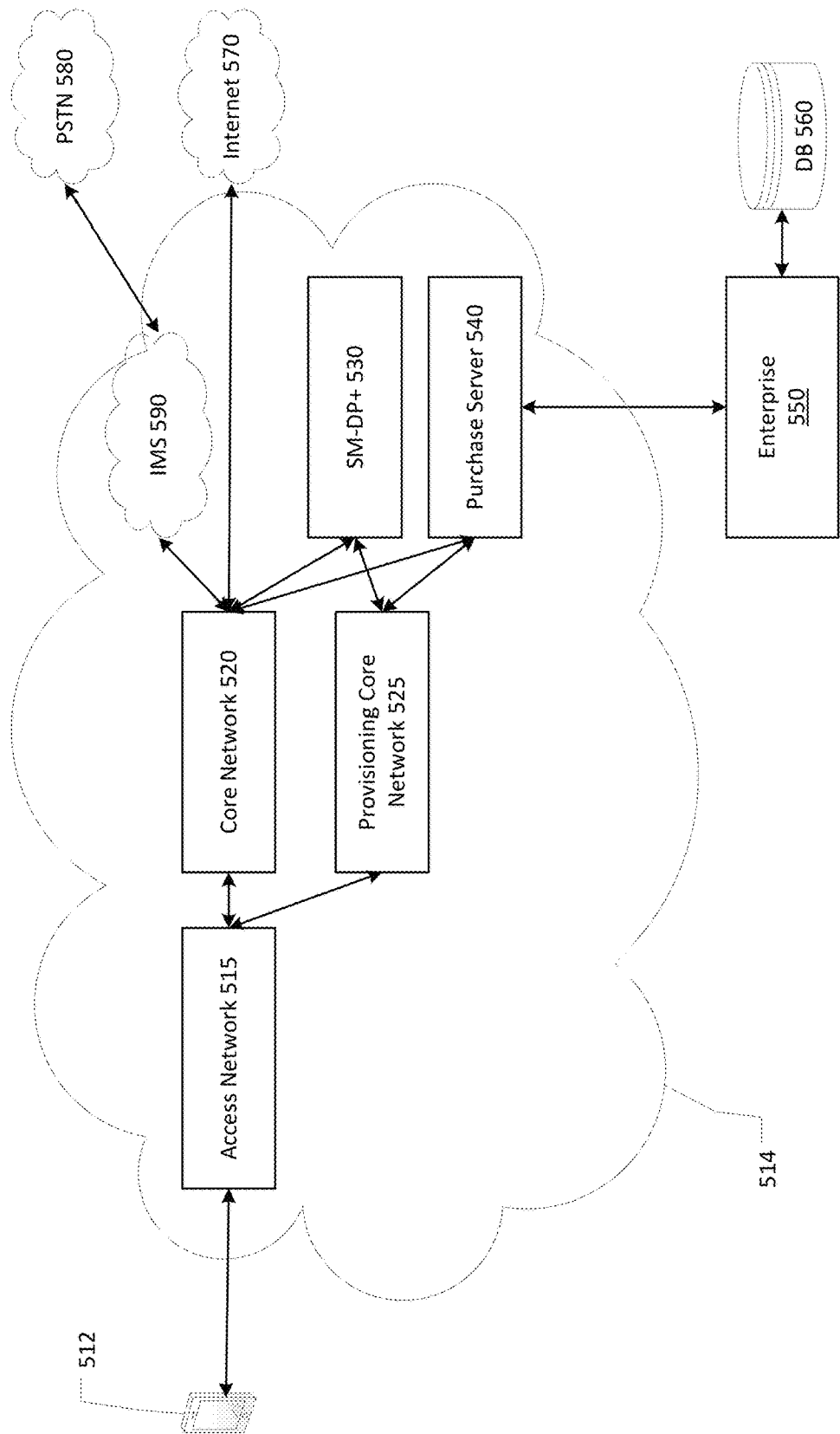
FIG. 6 depicts an example system for provisional registration of mobile devices.

Referring to FIG. 6, in some embodiments a different core network may be implemented. In some scenarios, device 512 does not have the ability to attach to the core network 520 because it is not provisioned for that network. However, the device 512 may be able to authenticate to an alternative core network (the "provisioning core network" 525), to which device 512 authenticates using identifiers such as its IMEI, EID, or other certificates associated with the eUICC or the device. The provisioning core network 525 may be configured to provide access to the servers needed to obtain an operational profile. Once this occurs, device 512 may attach to the core network 520 and access other resources. A connectivity configuration may be provided by the core network 520 to enable access to purchase server (SM-DS) 540. The device 512 may send a purchase request to the purchase server (SM-DS) 540. An activation code may be provided by the purchase server (SM-DS) 540, which may be used to access the SM-DP+ 530. The SM-DP+ 530 may provide an eSIM profile for download to the device 512. The device 512 may activate the downloaded eSIM profile and connect to the associated mobile network, after which the device may access the PSTN 580, Internet 570, and other services provided by the mobile network operator.

Figure 7:
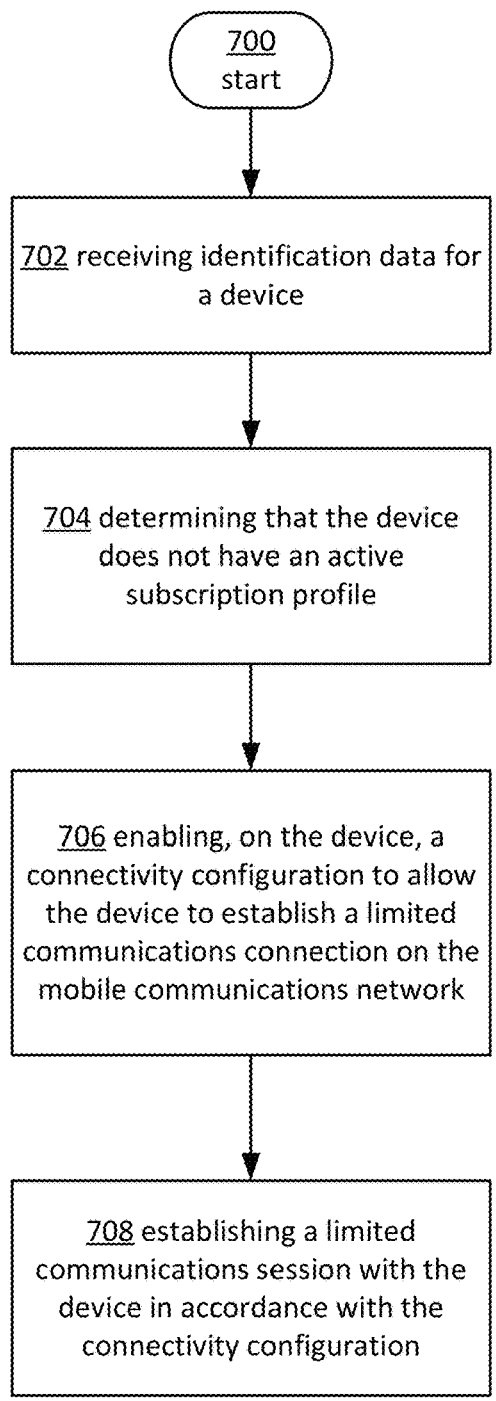
FIG. 7 depicts an operational procedure for provisional registration of mobile devices.

FIG. 7 illustrates an example operational procedure for provisionally registering a mobile device in accordance with this disclosure. In an embodiment, the operational procedure may be implemented in a computing device. The computing device may have a memory that has stored thereon computer-executable instructions that, when executed, cause the computing device to perform operations as described. Referring to FIG. 6, operation 700 begins the operational procedure. Operation 700 may be followed by operation 702. Operation 702 illustrates receiving, by a core network of the mobile communications network, identification data for a device.

Operation 702 may be followed by operation 704. Operation 704 illustrates determining, by the core network, that the device does not have an active subscription profile for accessing mobile communications services provided by the mobile network operator on the mobile communications network.

Operation 704 may be followed by operation 706. Operation 706 illustrates enabling, on the device, a connectivity configuration to allow the device to establish a limited communications connection on the mobile communications network, wherein the limited connection enables receiving data pertaining to subscriptions for the device to access the mobile communications services provided by the mobile network operator on the mobile communications network, sending data indicative of a subscription selection, and receiving an eSIM profile.

Operation 706 may be followed by operation 708. Operation 708 illustrates establishing the limited communications session with the device in accordance with the connectivity configuration.

EXAMPLE CLAUSES

The disclosure presented herein may be considered in view of the following clauses.

Example Clause A, a method of provisionally registering a device configured to communicate on a mobile communications network operated by a mobile network operator, the method comprising:

receiving, by a core network of the mobile communications network, unique identification data for a device;

determining, by the core network, that the device does not have an active subscription profile for accessing mobile communications services provided by the mobile network operator on the mobile communications network;

enabling, on the device, a connectivity configuration to allow the device to establish a limited communications connection on the mobile communications network, wherein the limited connection enables receiving data pertaining to subscriptions for the device to access the mobile communications services provided by the mobile network operator on the mobile communications network, sending data indicative of a subscription selection, and receiving an eSIM profile.

Example Clause B, the method of Example Clause A, wherein the unique identification data is an IMEI, EID, or a serial number.

Example Clause C, the method of any one of Example Clauses A through B, wherein the subscription information is provided by a purchase server or SM-DS.

Example Clause D, the method of any one of Example Clauses A through C, wherein the purchase server or SM-DS provides the device with an activation code usable to obtain the eSIM profile.

Example Clause E, the method of any one of Example Clauses A through D, wherein the core network is configured to provide emergency communications services on the mobile communications network.

Example Clause F, the method of any one of Example Clauses A through E, wherein the connectivity configuration is operable to provide access to purchase servers of a plurality of mobile network operators.

Example Clause G, the method of any one of Example Clauses A through F, wherein the limited communications connection is bandwidth-throttled.

Example Clause H, the method of any one of Example Clauses A through G, wherein the mobile network operator identifier includes a location of a SM-DP wherein the limited communications connection is configured to prevent general access to the Internet.

Example Clause I, the method of any one of Example Clauses A through H, wherein the limited communications connection is configured to limit a number of times the device is allowed to attempt the provisional registration.

Example Clause J, the method of any one of Example Clauses A through I, wherein the device is associated with an enterprise and preconfigured by the enterprise with a subscription profile, wherein the device is automatically associated with the subscription profile.

Example Clause K, the method of any one of Example Clauses A through J, wherein the device obtains limited communications services from an alternative core network that is served by an access network Example Clause L, the method of any one of Example Clauses A through K, wherein the core network is not associated to a single mobile network operator and is exclusively configured to provide provisional registration for unregistered devices.

Example Clause M, the method of any one of Example Clauses A through L, wherein the provisionally registering is a modified emergency services registration process.

Example Clause N, a computing device comprising:

a memory storing thereon instructions that when executed by a processor of the computing device, cause the computing device to perform operations comprising:

establishing a communications session with an access network of a mobile communications network, wherein the computing device does not have an active subscription profile for accessing mobile communications services provided by a mobile network operator on the mobile communications network;

sending, to the access network, identification data for the computing device;

allowing the computing device to establish a limited connection on the mobile communications network using, wherein the limited connection is usable to receive data pertaining to subscriptions for accessing the mobile communications services, sending data indicative of a subscription selection, and receiving an eSIM profile;

using the limited connection to receive the eSIM profile; and activating the eSIM profile and connecting to an associated mobile network.

Example Clause O, the computing device of Example Clause N, further comprising sending a purchase request to a purchase server.

Example Clause P, the computing device of any one of Example Clauses N through O, further comprising receiving an activation code from the purchase server.

Example Clause Q, the computing device of any one of Example Clauses N through P, further comprising using the activation code to access a SM-DP+ to obtain the eSIM profile.

Example Clause R, a system configured to communicate with one or more devices via a mobile communications network, the system configured to:

receive identification data for a device that does not have an active subscription profile for accessing a mobile communications network;

send, to the device, a connectivity configuration that is operable to allow the device to establish a limited connection on the mobile communications network, wherein the limited connection is limited to receiving data pertaining to subscriptions for accessing the mobile communications services, sending data indicative of a subscription selection, and receiving an eSIM profile; and allow the device to use the limited connection to receive the data pertaining to subscription information and to select and receive an eSIM profile.

Example Clause S, the system of Example Clause R, wherein the limited connection is restricted to obtaining the eSIM profile and does not allow general access to the Internet.

Example Clause T, the system of any of Example Clauses R through S, wherein the server is further configured to allow the device to activate the eSIM profile and access services of a mobile network operator.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of provisionally registering a device to communicate on a wide-area mobile communications network operated by a mobile network operator, the method comprising:
   receiving, by a core network of the mobile communications network, identification data for a device;
   determining, by the core network, that the device does not have an active subscription profile for accessing mobile communications services provided by the mobile network operator on the mobile communications network; and
   enabling, on the device, a connectivity configuration to allow the device to establish a limited communications connection on the mobile communications network, wherein the limited connection enables receiving data pertaining to subscriptions for the device to access the mobile communications services provided by the mobile network operator on the mobile communications network, sending data indicative of a subscription selection, and receiving an embedded subscriber identity module (eSIM) profile, wherein the core network is not associated to a single mobile network operator and is exclusively configured to provide provisional registration for unregistered devices.

2. The method of claim 1, wherein the identification data is an IMEI, EID, or a serial number.

3. The method of claim 1, wherein the data pertaining to subscriptions is provided by a purchase server or global discovery server (SM-DS).

4. The method of claim 3, wherein the purchase server or SM-DS provides the device with an activation code usable to obtain the eSIM profile.

5. The method of claim 1, wherein the core network is configured to provide emergency communications services on the mobile communications network.

6. The method of claim 1, wherein the connectivity configuration is operable to provide access to purchase servers of a plurality of mobile network operators.

7. The method of claim 1, wherein the limited communications connection is bandwidth-throttled.

8. The method of claim 1, wherein the limited communications connection is configured to prevent general access to the Internet.

9. The method of claim 1, wherein the limited communications connection is configured to limit a number of times the device is allowed to attempt the provisional registration.

10. The method of claim 1, wherein the device is associated with an enterprise and preconfigured by the enterprise with a subscription profile, wherein the device is automatically associated with the subscription profile.

11. The method of claim 1, wherein the device obtains limited communications services from an alternative core network that is served by an access network.

12. The method of claim 1, wherein the provisionally registering is a modified emergency services registration process.

13. A computing device comprising:
a memory storing thereon instructions that when executed by a processor of the computing device, cause the computing device to perform operations comprising:
establishing, by a core network of a mobile communications network, a communications session with a mobile communications network, wherein the computing device does not have an active subscription profile for accessing mobile communications services provided by a mobile network operator on the mobile communications network;
sending, via the core network, identification data for the computing device;
establishing a limited connection on the mobile communications network, wherein the limited connection is usable to receive data pertaining to subscriptions for accessing the mobile communications services, send data indicative of a subscription selection, and receive an embedded subscriber identity module (eSIM) profile;
using the limited connection to receive the eSIM profile; and
activating the eSIM profile and connecting to an associated mobile network, wherein the computing device obtains limited communications services from an alternative core network that is served by an access network.

14. The computing device of claim 13, further comprising sending a purchase request to a purchase server.

15. The computing device of claim 14, further comprising receiving an activation code from the purchase server.

16. The computing device of claim 15, further comprising using the activation code to access a SM-DP+ to obtain the eSIM profile.

17. A system configured to communicate with one or more devices via a mobile communications network, the system configured to:
receive identification data for a device that does not have an active subscription profile for accessing a mobile communications network;
send, to the device via a core network, a connectivity configuration that is operable to allow the device to establish a limited connection on the mobile communications network, wherein the limited connection is limited to receiving data pertaining to subscriptions for accessing the mobile communications network, sending data indicative of a subscription selection, and receiving an embedded subscriber identity module (eSIM) profile; and
allow the device to use the limited connection to receive the data pertaining to subscription information and to select and receive an eSIM profile, wherein the device obtains limited communications services from an alternative core network that is served by an access network.

18. The system of claim 17, wherein the limited connection is restricted to obtaining the eSIM profile and does not allow general access to the Internet.

19. The system of claim 17, wherein the system is further configured to allow the device to activate the eSIM profile and access services of a mobile network operator.

* * * * *